(12) United States Patent
Lee et al.

(10) Patent No.: US 8,332,707 B2
(45) Date of Patent: Dec. 11, 2012

(54) METHOD OF TRANSMISSION OF LARGE DATA AMOUNTS IN SENSOR NETWORK BASED ON MAC

(75) Inventors: Kye-seon Lee, Daejeon-si (KR);
Nae-soo Kim, Daejeon-si (KR);
Cheol-sig Pyo, Daejeon-si (KR);
Jong-suk Chae, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 529 days.

(21) Appl. No.: 12/611,532

(22) Filed: Nov. 3, 2009

(65) Prior Publication Data
US 2010/0153808 A1 Jun. 17, 2010

(30) Foreign Application Priority Data
Dec. 17, 2008 (KR) .................. 10-2008-0128718

(51) Int. Cl.
*G06F 11/00* (2006.01)
(52) U.S. Cl. ...................................... 714/748
(58) Field of Classification Search .............. 714/746, 714/748, 749; 370/395.4, 473
See application file for complete search history.

(56) References Cited

U.S. PATENT DOCUMENTS

| | | | |
|---|---|---|---|
| 6,611,515 B1 * | 8/2003 | Balachandran et al. | 370/349 |
| 2005/0002363 A1 * | 1/2005 | Cheng et al. | 370/338 |
| 2005/0265371 A1 * | 12/2005 | Sharma et al. | 370/428 |
| 2006/0062250 A1 * | 3/2006 | Payne, III | 370/468 |
| 2007/0133583 A1 | 6/2007 | Kim et al. | |
| 2009/0046626 A1 * | 2/2009 | Shao et al. | 370/320 |
| 2010/0037112 A1 * | 2/2010 | Graumann | 714/748 |
| 2010/0325507 A1 * | 12/2010 | Sung et al. | 714/749 |

FOREIGN PATENT DOCUMENTS

| KR | 1999-0075513 | 10/1999 |
|---|---|---|
| KR | 10-2007-0057623 | 6/2007 |

OTHER PUBLICATIONS

Ed Callaway, et al., Home Networking with IEEE 802.15.4: A Developing Standard for Low-Rate Wireless Personal Area Networks, Aug. 2002, IEEE, pp. 70-77.*

* cited by examiner

*Primary Examiner* — Marc Duncan
(74) *Attorney, Agent, or Firm* — Staas & Halsey LLP

(57) ABSTRACT

A large data transmission method in a sensor network based on a media access control (MAC) is provided. The method includes dividing data to be transferred into a plurality of data segments; generating a plurality of media access control (MAC) segmented data frames by including in each data segment an indication that the data is generated by segmentation and assigning a sequence number to the data segment; transmitting the generated MAC segmented data frames sequentially; receiving a MAC reception failure frame indicating reception failure for a predetermined period of time from a receiving sensor node after completing the transmitting of all the MAC segmented data frames; and retransmitting the MAC segmented data frames which correspond to at least one sequence number included in the received MAC reception failure frame. Accordingly, large data transmission times can be reduced in a MAC for a sensor network.

14 Claims, 5 Drawing Sheets

FIG.2

| Frame Type b2 b1 b0 | Description |
|---|---|
| 000 | Beacon |
| 001 | Data |
| 010 | Acknowledgment |
| 011 | MAC command |
| 100 | Segmented Data |
| 101 | Negative Acknowledgent |
| 110-111 | Reserved |

METHOD OF TRANSMISSION OF LARGE DATA AMOUNTS IN SENSOR NETWORK BASED ON MAC

CROSS REFERENCE TO RELATED APPLICATION

This application claims the benefit under 35 U.S.C. §119(a) of Korean Patent Application No. 10-2008-0128718, filed on Dec. 17, 2008, the disclosure of which is incorporated herein in its entirety by reference.

BACKGROUND

1. Field

The following description relates to a method of a sensor network, and more particularly to a data transmission method in a sensor network.

2. Description of the Related Art

Wireless sensor networks (WSN) are formed to comply with the Institute of Electrical and Electronics Engineers (IEEE) 802.15.4 standards. Although a sensor node forming the sensor network should be in accordance with schemes of a physical (PHY) layer and a media access control layer, which are specified by IEEE 802.15.4, sensor nodes have been recently manufactured according to various medium access control (MAC) technologies which do not conform with the standards. Generally, sensor nodes are configured in accordance with appropriate MAC technologies including IEEE 802.15.4, simple MAC (S-MAC) and Berkely MAC (B-MAC), a PHY layer is formed in strict compliance with IEEE 802.15.4 standards, and MAC technologies for a sensor network are implemented to be suitable for a low data transfer rate (between about 40 kbps and 250 kbps) which is specified in the PHY layer.

Since conventionally it was assumed that the amount of information obtained by sensors in a sensor network is small, the sensors were regarded suitable to transmit and receive data even at a low data transfer rate in the sensor network. However, recently there have been increasing attempts to transmit image data by the use of a camera device mounted on a sensor node, and thus the need for large data transmission rates has arisen.

When large data transmission rates are required, conventionally, the large amount of data is segmented and processed in a higher layer of MAC. In a conventional MAC layer, as many data frames as the number of data segments are processed without information of the data segment.

Generally, a usual image file has a size exceeding 20 Kbytes. On the assumption that MAC data of 20 Kbytes with its MAX_FRAME_LENGTH of 128 bytes is transmitted by use of a sensor node using 915 MHz band at data rate of 40 kbps, the sensor node should transmit 100 bytes of data 200 times in order to transmit the whole MAC data since MAC payload, i.e. the amount of data size which can be transmitted at once considering the size of MAC header, is 100 bytes. Additionally, when a reception time of an acknowledgement (ACK) frame at each time of transmission is considered, the ACK frame indicating whether the data is received by a receiving node, the total size of data is (128 bytes (MAC data including MAC header)+5 bytes (ACK))×200 (frequency)= 26,600 bytes. Since the data rate of the sensor node is 40 Kbits/sec, the total time spent on transmitting packets of 26,600 bytes is 26,600×8 bits/40 Kbits=about 5.32 seconds.

The above calculation is simply conducted without considering the fact that the sensor node waits for macAckWaitDuration (three times more than a normal data transmission time) when the sensor node does not receive a subsequent ACK frame while repeating transmission of following data after confirming receipt of an ACK frame. Accordingly, the total transmission time is generally increased. In addition, since the above calculation does not take into account the processing time for the ACK frame, the actual total transmission time is much longer, and thus it may take several tens of seconds or more than one minute.

For example, if the above large data transmission technique using a MAC high layer for processing the large data is employed in a security system which monitors the opening and closing of a door to detect an intruder, and if an intruder is present, photographs the intruder, and transmits an image of the intruder to a control center, then since it takes several tens of seconds to transfer the image data from one sensor node to another in a sensor network, it may take more than several tens of seconds, i.e., several minutes for the image data to reach the control center.

SUMMARY

Accordingly, in one aspect, there is provided a large data transmission method which can reduce a large data transmission time.

In one general aspect, there is provided a large data amount transmission method of a sensor node included in a sensor network, the method including: dividing data to be transferred into a plurality of data segments; generating a plurality of media access control (MAC) segmented data frames and including in each data segment an indication that the data is generated by segmentation and assigning a sequence number to the data segment; transmitting the generated MAC segmented data frames sequentially; receiving a MAC reception failure frame indicating reception failure for a predetermined period of time from a receiving sensor node after completing the transmitting of all the MAC segmented data frames; and retransmitting the MAC segmented data frames which correspond to at least one sequence number included in the received MAC reception failure frame.

The generating of the MAC segmented data frames may include assigning a value indicating data segment in a MAC frame type field of each MAC segmented data frame.

The generating of the MAC segmented data frames may include allocating a sequence number assigned to data segment in a sequence number field of each MAC segmented data frame.

In another general aspect, there is provided a large data transmission method of a sensor node included in a sensor network, the method including: receiving a media access control (MAC) data frame; determining whether the received MAC data frame is a segmented data frame based on a value of a frame type field of the received MAC data frame; storing a sequence number assigned to the MAC data frame if the received MAC data frame is a MAC segmented data frame; identifying missing sequence numbers based on the stored sequence numbers when reception of a plurality of MAC segmented data frames is completed; and requesting a transmitting sensor node to retransmit a MAC segmented data frame corresponding to the identified missing sequence number.

The requesting of the retransmission may include generating a MAC reception failure frame having a frame type field in which a value indicating reception failure is stored, and transmitting the generated MAC reception failure frame to the transmitting sensor node.

The MAC reception failure frame may be generated to have as many sequence fields as the number of the missing sequence numbers, the sequence fields storing the missing sequence numbers assigned thereto.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 2 is a table showing a value of a frame type field.

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of is well-known functions and structures are omitted to enhance clarity and conciseness.

Figure 1:
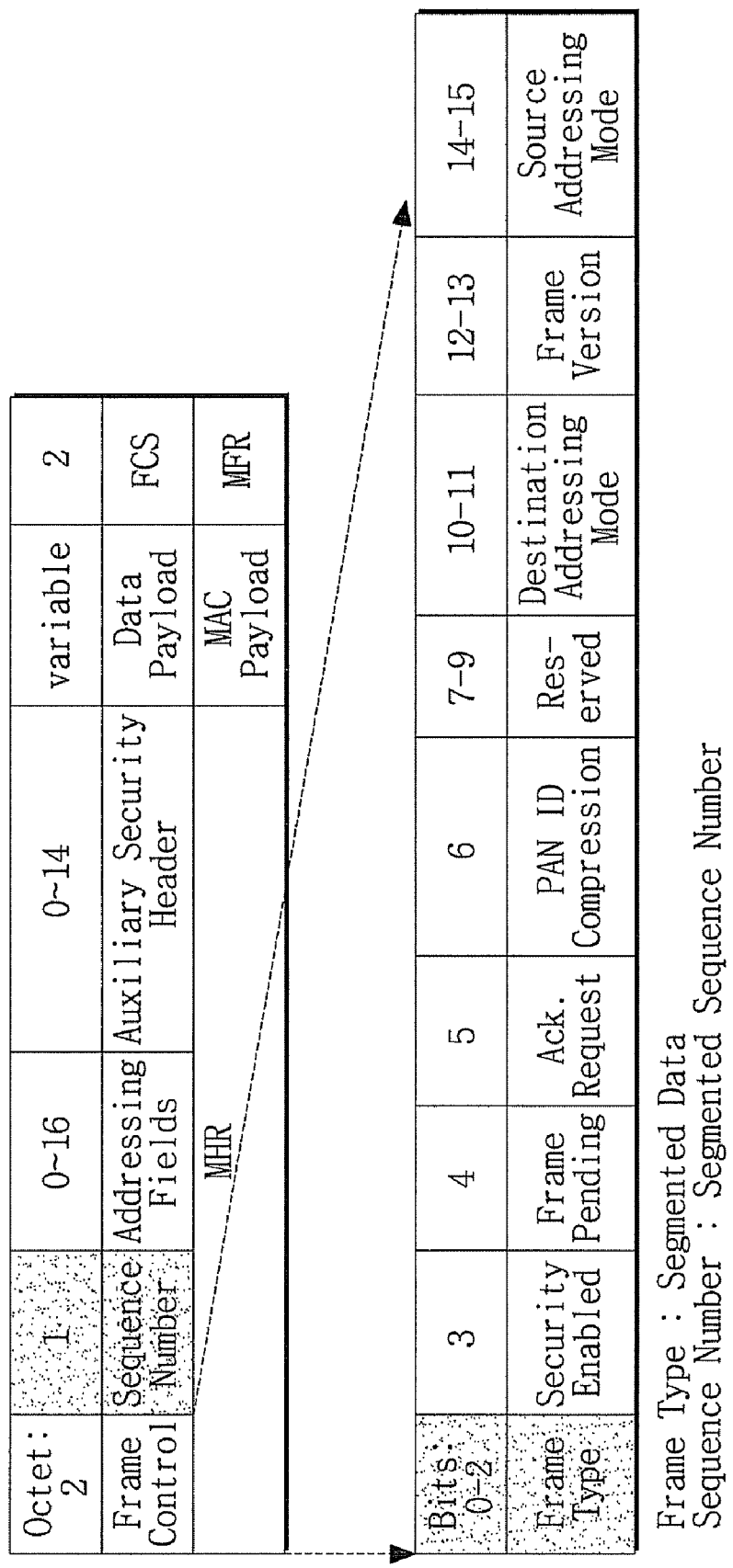
FIG. 1 illustrates a data segment format.

FIG. 1 shows diagrams illustrating a media access control (MAC) data frame format of a MAC layer in accordance with Institute of Electrical and Electronics Engineers (IEEE) 802.15.4, and is a data segment format proposed for dividing and transmitting large amounts of data.

Referring to FIG. 1, a frame type field indicates a type of a MAC frame. According to IEEE 802.15.4 standard, numbers between 100 and 111 are reserved and thus not used. In an exemplary embodiment, the reserved numbers are utilized to be allocated for data segment and a negative acknowledgement (NACK) type.

A sequence number field is a field where a sequence number designated with a data source name (DSN) is written when a frame type is a data frame. When a value indicating the data segment according to the exemplary embodiment is written in the frame type field, segmented sequence number of the data segment is allocated in the segmented number field.

FIG. 2 is a table showing values indicating data segments and NACK in the frame type field of FIG. 1. In one exemplary embodiment, it is assumed that numbers between 100 and 111 are reserved in accordance with IEEE 802.15.4 standard and, among the reserved numbers, 100 is allocated for data segment and 101 is allocated for NACK.

Figure 3:
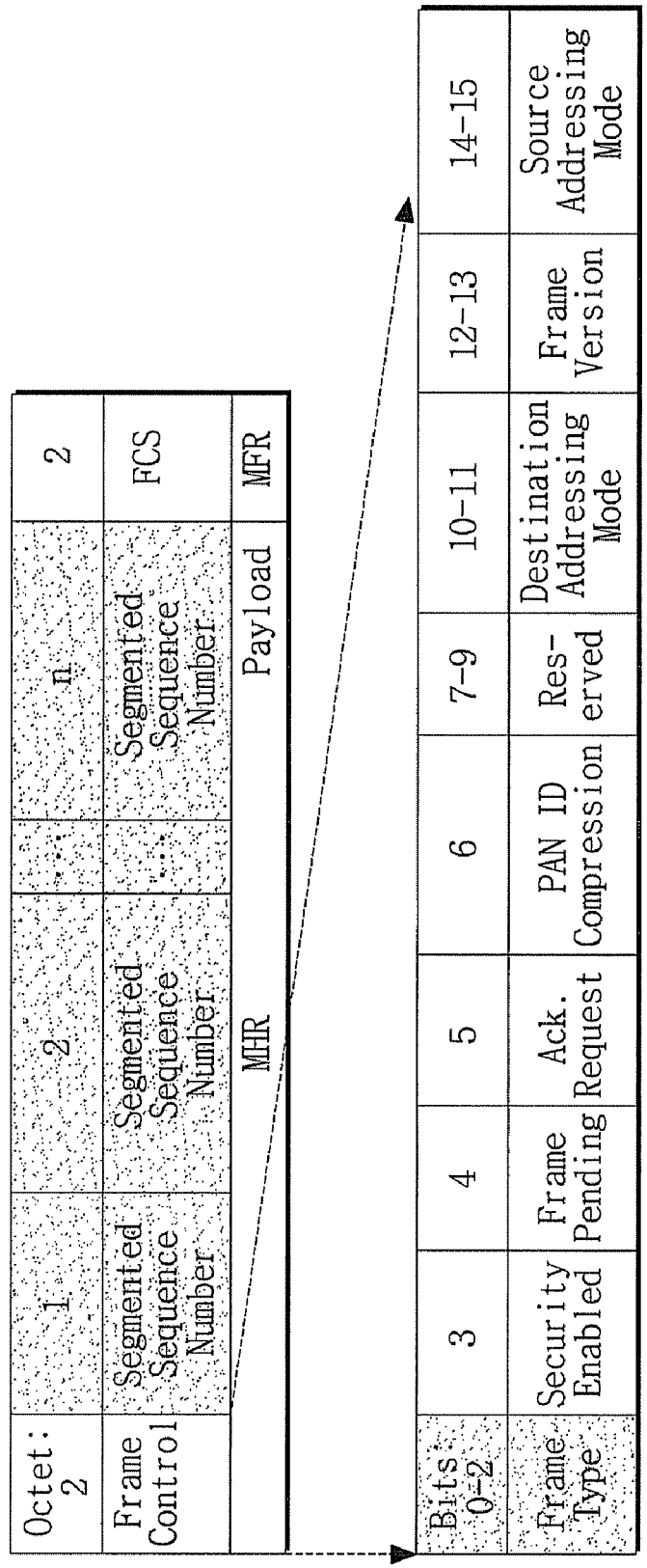
FIG. 3 illustrates a NACK format.

FIG. 3 is NACK format specified according to an exemplary embodiment.

Referring to FIG. 3, a MAC NACK frame includes a frame type field, where a value indicating negative acknowledgement is allocated, and a segmented sequence number field where sequence numbers of pieces of data which have not been received among transmitted data segments are sequentially allocated. The MAC NACK frame is received by a transmitting sensor node from a receiving sensor node, and the transmitting sensor node retransmits pieces of corresponding data to the format of FIG. 1 with reference to values in the segmented sequence number field of the MAC NACK frame.

Figure 4:
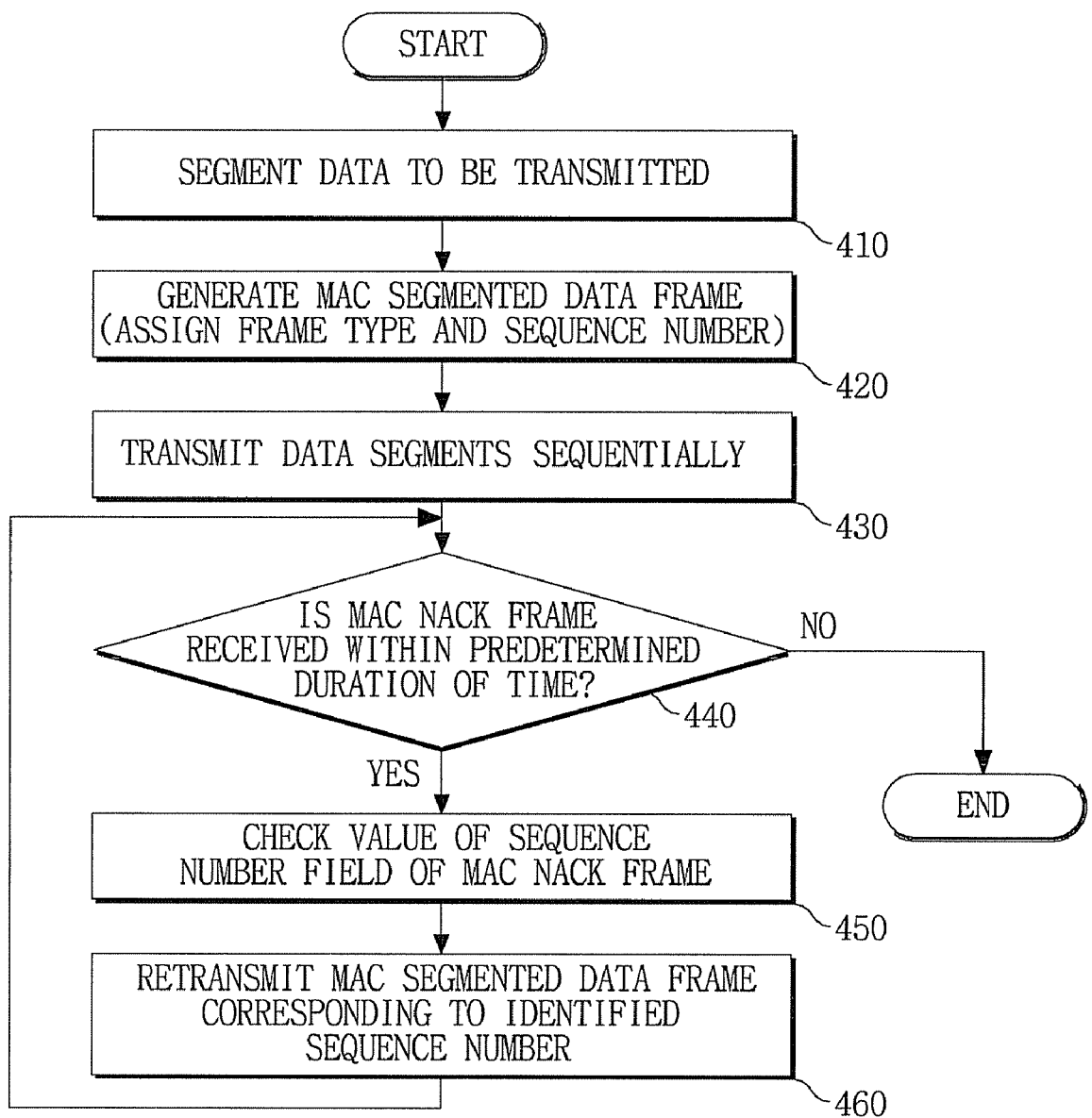
FIG. 4 is a flowchart illustrating a method of processing large data in a MAC layer by a transmitting sensor node according to an exemplary embodiment.

FIG. 4 is a flowchart illustrating a method of processing large amounts of data in a MAC layer by a transmitting sensor node according to an exemplary embodiment.

A sensor node to transmit the large amounts of data into data segments (operation 410) and assigns sequence numbers to the data segments to generate MAC segmented data frames (operation 420). In this case, the values described in FIG. 1 are allocated in a frame type field and a sequence number field of each of the generated MAC segmented data frame. The transmitting sensor node transmits all of the MAC segmented data frames sequentially (operation 430). The sensor node which has finished the transmission waits to receive a MAC NACK frame for a predetermined period of time, i.e., macAckWaitDuration. When the sensor node receives the MAC NACK frame within the macAckWaitDuration (operation 440), the sensor node checks a sequence number written on at least one segmented sequence number frame of the received MAC NACK frame (operation 450). Then, the sensor node retransmits all MAC segmented data frames corresponding to the found sequence numbers (operation 460). The above operations are repeatedly performed until the transmitting sensor node does not receive a MAC NACK frame.

Figure 5:
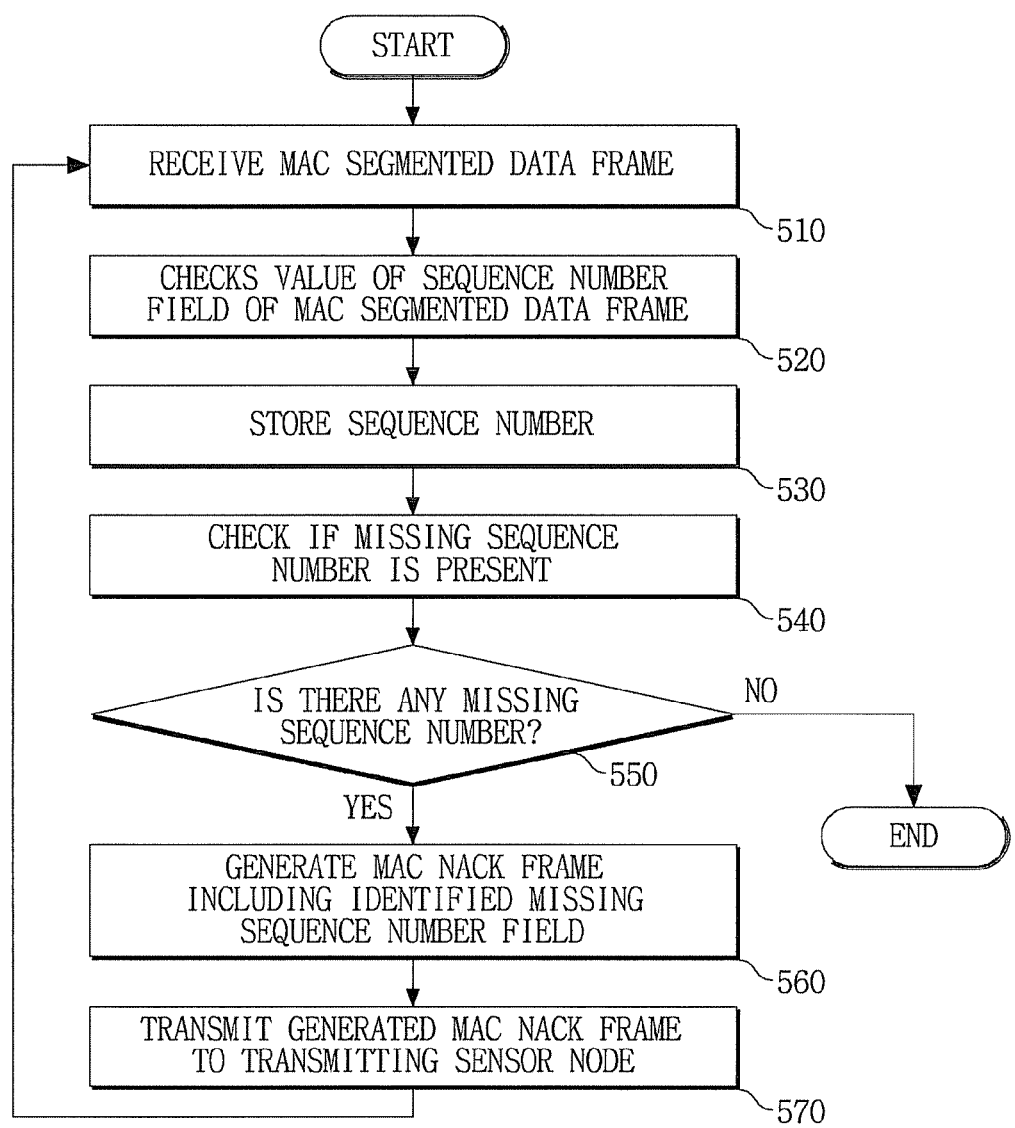
FIG. 5 is a flowchart illustrating a method of processing data in a MAC layer by a receiving sensor node according to an exemplary embodiment.

FIG. 5 is a flowchart illustrating a method of processing data in a MAC layer by a receiving sensor node according to an exemplary embodiment. Referring to FIG. 5, the receiving sensor node receives a MAC segmented data frame having a frame type field that indicates data segment (operation 510). Then, the receiving sensor node checks a value of a sequence number field of the MAC segmented data frame (operation 520), and stores the checked sequence number (operation 530). When all pieces of MAC segmented data are completely received, the receiving sensor node checks whether there are any missing sequence numbers in the sequence number field (operation 540). If there is a missing sequence number (operation 550), the sensing sensor node generates a MAC NACK frame as shown in FIG. 3 (operation 560), and transmits the MAC NACK frame to the transmitting sensor node (operation 570).

In one exemplary embodiment, the number of segmented sequence number fields included in the MAC NACK frame is the same as the total number of the missing sequence numbers, and each of the segmented sequence number field has a missing sequence number allocated thereto. As such, the receiving sensor node generates a single MAC NACK frame and transmits it to the transmitting sensor node. Alternatively, the receiving sensor node may generate MAC NACK frames corresponding to the respective missing sequence numbers and transmits them to the transmitting sensor node. If there is no missing sequence number, the receiving sensor node does not transmit a NACK.

In addition, the receiving sensor node that issues the NACK response stores segmented sequence numbers allocated in the NACK, and compares each of the stored segmented sequence numbers with a value of the sequence number field of each of MAC segmented data frames retransmitted from the transmitting sensor node to check if there is any MAC segmented data frame that has failed to be transmitted. The receiving sensor node repeatedly issues the NACK response until receiving all pieces of MAC segmented data.

If an image file of 20 Kbytes is transmitted from a sensor node having a data rate of 40 kbps and using 915 MHz through the above-described procedures, MAX_FRAME_LENGTH is 128 bytes and the amount of data to be transmitted at one time is about 100 bytes with consideration of a size of MAC header, and thus the image file needs to be transmitted 200 times. The total size of the data to be transmitted is approximately {a piece of data of 128 bytes×200 times=25,600 bytes}. Since data transmission of 40 Kbits per second is possible, it takes {25,600×8 bits/40 kbits=5.12 seconds} to transmit data packets of 25,600 bytes. The transmitting sensor node waits for a NACK for a predetermined period of time, i.e., macAckWaitDuration after completely transmitting the data packets. When receiving the NACK, the transmitting sensor node retransmits a data packet corresponding to the NACK. When the transmitting sensor node does not receive the NACK during the predetermined period of time, i.e., macAckWaitDuration, the transmitting sensor node concludes that all of the data has been safely transmitted. Even if not all of the data is transmitted to the receiving sensor node at the first transmission, the transmitting sensor node simply waits for receiving NACKs as many times as the number of times of retransmission, and NACK transmission/reception process is also performed as many times as the number of times of retransmission, and hence only a minor period of extra time is added to the total time of transmission of the entire data.

In a conventional method, when a large amount of data is divided into n data packets, a transmitting sensor node should wait for a predetermined period of time, i.e., macAckWaitDuration to receive an acknowledgment ACK, with respect to each data packet, whereas the transmitting sensor node according to the exemplary embodiment only needs to wait a time to receive a NACK for each retransmission.

Accordingly, the MAC technology described above can reduce large data transmission times in the MAC of a sensor network, thereby allowing an efficient configuration of a sensor network in various forms for transmitting large amounts of data such as an image.

A number of exemplary embodiments have been described above. Although the present invention is based on IEEE 802.15.4 standard, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A large data amount transmission method of a sensor node included in a sensor network, the method comprising:
   dividing data to be transferred into a plurality of data segments;
   transmitting the generated MAC segmented data frames sequentially;
   receiving a MAC reception failure frame indicating reception failure for a predetermined period of time from a receiving sensor node after completing the transmitting of all the MAC segmented data frames; and
   retransmitting the MAC segmented data frames which correspond to at least one sequence number included in the received MAC reception failure frame,
   wherein the MAC reception failure frame has a frame type field in which a value indicating data reception failure is allocated.

2. The method of claim 1, wherein the generating of the MAC segmented data frames comprises assigning a value indicating data segment in a MAC frame type field of each MAC segmented data frame.

3. The method of claim 2, wherein each MAC segmented data frame is a frame generated by expanding a MAC data frame format of a MAC layer in accordance with the Institute of Electrical and Electronics Engineers (IEEE) 802.15.4 standard.

4. The method of claim 3, wherein the value indicating the data segment is one of reserved numbers used to designate a frame type in the IEEE 802.15.4 standard.

5. The method of claim 1, wherein the generating of the MAC segmented data frames comprises allocating a sequence number assigned to data segment in a sequence number field of each MAC segmented data frame.

6. The method of claim 5, wherein each of the MAC segmented data frames is a frame generated by expanding a MAC data frame format of a MAC layer in accordance with the Institute of Electrical and Electronics Engineers (IEEE) 802.15.4 standard.

7. The method of claim 1, wherein the value indicating reception failure is one of reserved numbers used to designate a frame type in the IEEE 802.15.4 standard.

8. The method of claim 1, wherein the MAC reception failure frame includes a sequence number field in which a sequence number of a MAC segmented data frame that has failed to be received by the receiving sensor node is allocated.

9. The method of claim 8, wherein the MAC reception failure frame includes as many sequence number fields as the number of MAC segmented data frames that have failed to be received.

10. A large data transmission method of a sensor node included in a sensor network, the method comprising:
    receiving a media access control (MAC) data frame;
    determining whether the received MAC data frame is a segmented data frame based on a value of a frame type field of the received MAC data frame;
    storing a sequence number assigned to the MAC data frame if the received MAC data frame is a MAC segmented data frame;
    identifying missing sequence numbers based on the stored sequence numbers when reception of a plurality of MAC segmented data frames is completed; and
    requesting a transmitting sensor node to retransmit a MAC segmented data frame corresponding to the identified missing sequence number,
    wherein the requesting of the retransmission comprises generating a MAC reception failure frame having a frame type field in which a value indicating reception failure is stored, and transmitting the generated MAC reception failure frame to the transmitting sensor node.

11. The method of claim 10, wherein each MAC segmented data frame is a frame generated by expanding a MAC data frame format of a MAC layer in accordance with the Institute of Electrical and Electronics Engineers (IEEE) 802.15.4 standard.

12. The method of claim 11, wherein the value of the frame type field to indicate a segmented data frame is one of reserved numbers used to designate a frame type in the IEEE 802.15.4 standard.

13. The method of claim 10, wherein the value indicating reception failure is one of reserved numbers used to designate a frame type in the IEEE 802.15.4 standard.

14. The method of claim 10, wherein the MAC reception failure frame is generated to have as many sequence fields as the number of the missing sequence numbers, the sequence fields storing the missing sequence numbers assigned thereto.

* * * * *